United States Patent [19]

Rosica et al.

[11] Patent Number: 5,264,172
[45] Date of Patent: Nov. 23, 1993

[54] METHOD OF MAKING A MOLDED APPLIQUE PRODUCT

[75] Inventors: George B. Rosica, Hockessin, Del.; Vance E. Smith, Caro, Mich.

[73] Assignee: Kaumagraph Flint Corporation, Millington, Mich.

[21] Appl. No.: 786,341

[22] Filed: Nov. 8, 1991

[51] Int. Cl.$^5$ .................. B29C 45/16; B29C 45/14
[52] U.S. Cl. .................. 264/132; 264/153; 264/154; 264/247; 264/328.8; 264/328.12; 425/112
[58] Field of Search ............... 264/132, 246, 247, 266, 264/259, 154, 163, 153, 328.8, 328.12, 510; 425/112

[56] References Cited

U.S. PATENT DOCUMENTS

| 2,485,323 | 10/1949 | Schwartz | 264/328.8 |
| 2,931,119 | 4/1960 | Gits et al. | 264/266 |
| 3,122,598 | 2/1964 | Berger | 264/247 |
| 4,710,338 | 12/1987 | Bagnall et al. | 264/266 |

FOREIGN PATENT DOCUMENTS

| 565747 | 1/1981 | European Pat. Off. | 264/266 |
| 148611 | 7/1985 | European Pat. Off. | 264/316 |
| 57-18229 | 1/1982 | Japan | 264/132 |
| 57-25913 | 2/1982 | Japan | 264/132 |
| 62-263013 | 11/1987 | Japan | 264/316 |

Primary Examiner—Jan H. Silbaugh
Assistant Examiner—A. Y. Ortiz
Attorney, Agent, or Firm—Joseph W. Molasky and Associates

[57] ABSTRACT

A method of making a molded applique product. A printed applique substrate is formed into a three dimensional shape and placed into a mold whereupon a molten resin is injected into the mold cavity space located behind the formed substrate.

3 Claims, 6 Drawing Sheets

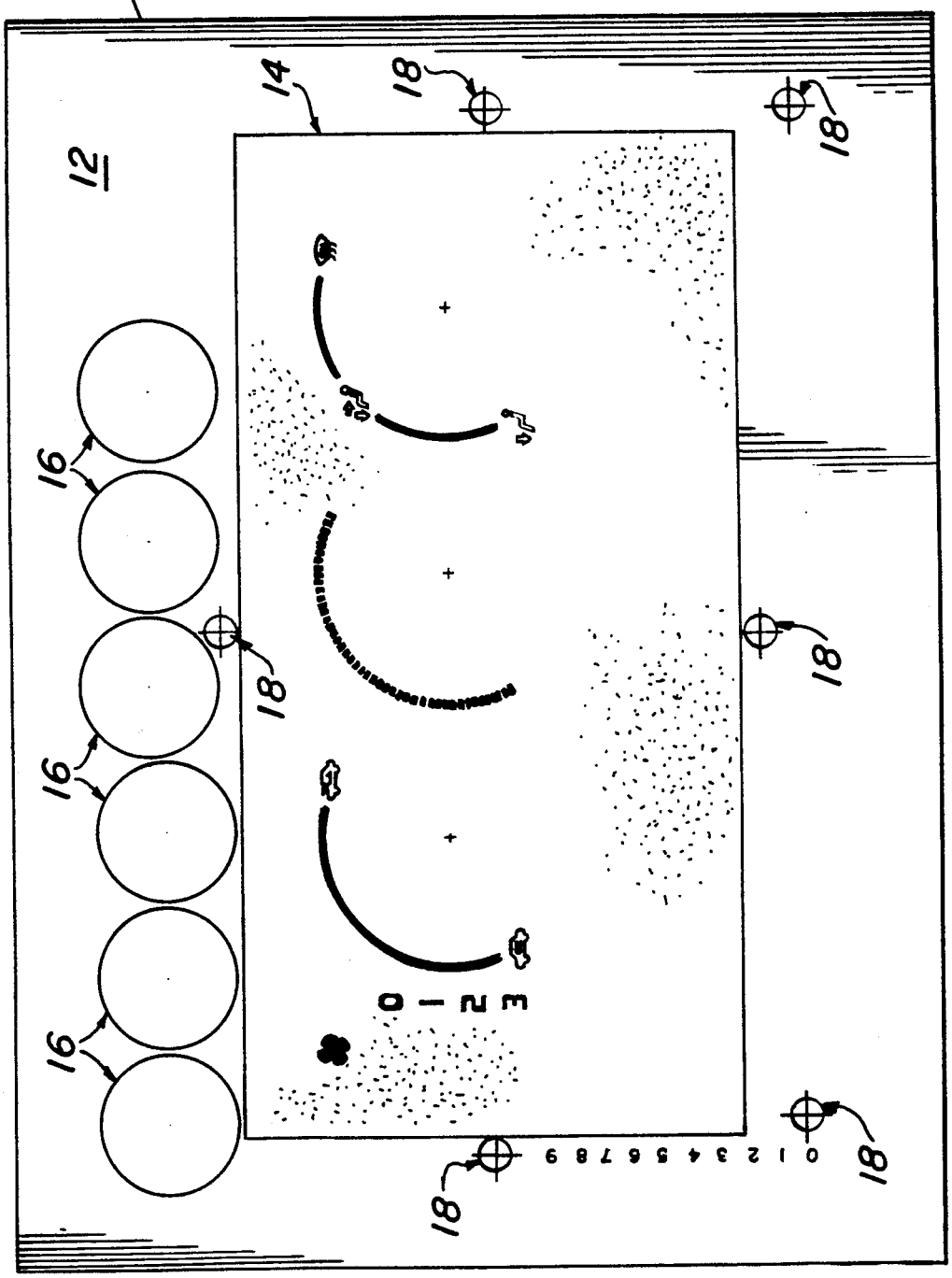

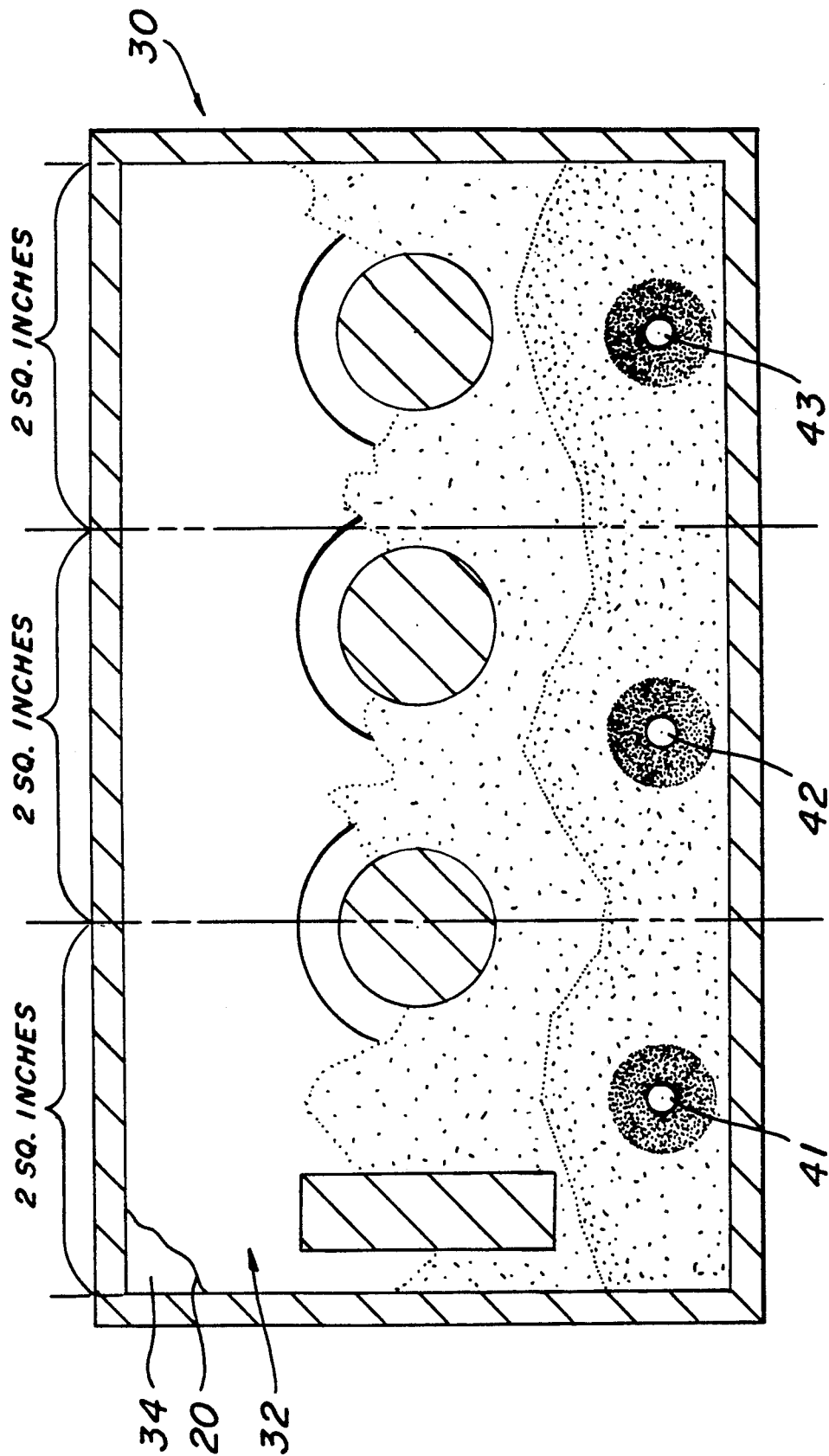

METHOD OF MAKING A MOLDED APPLIQUE PRODUCT

FIELD OF THE INVENTION

This invention relates to a method of making molded applique products of the type made of synthetic resins having printing on a surface thereof and made by a molding process. Products of this type are used, by way of example, to make automobile instrument panels.

DESCRIPTION OF THE PRIOR ART

Products of the indicated type have been made for many years by a method known in the art as an in-mold decorating process. This process, which has been in use since at least as early as 1972, was used to produce printed parts on polystyrene and polypropylene sheets that were, after printing, die cut and sent to injection molders to be in-molded into a finished product. By way of example, some of these products were plastic lunch boxes, pitchers and canisters. In this process, the overlays or in-mold decoratives were produced by offset printing and/or screen printing, and the parts were flat and were held into the mold with a static charge. Because the overlays or in-mold decoratives did not contain complete (100 per cent) ink coverage, it was possible to print on the rear surface of these parts and still have the molten plastic material fused to the rear surface of the plastic substrate, thus leaving a layer of plastic film on the outside to protect the graphics. In this process, the gating of the mold had to be such that the introduction of the plastic took place where there was no ink, since any ink present in this area would tend to move or distort. The bonding in this case would only take place between the clear plastic area of the overlay and the molding compound itself.

A molding method essentially the same as the in-mold decorating process described above is disclosed in U.S. Pat. No. 4,917,927. The patent claims novelty in the printing step wherein a synthetic resin sheet has an ink film applied to at least one side of the resin sheet wherein the ink film comprises one or more layers, each of which has a specific minimum thickness. The patent states that by this inking process that it is possible to produce a backlighting product. Backlighting products are well known in the art and are capable of making a pictorial image printed thereon look bright when viewed from the front if light is shone from the rear of the product. Products of this type are used to make automobile instrument panels. The patent discloses the printing on a flat resin sheet which is placed into a die into which a molten synthetic resin is injected pursuant to the in-mold technique discussed above.

The prior art techniques were not suitable for making a three dimensional applique of the type shown in FIG. 3 of the drawings. In fact, those skilled in the art believed it would not be possible to obtain the shape and configuration of this type while at the same time providing an acceptable decorative presentation. It was believed that during the in-mold process of the prior art the product would be deformed and thereby harm the decorative presentation.

SUMMARY OF THE INVENTION

It is the general object of the invention to provide a method of making applique products of the type made of synthetic resins and having printing thereon by a molding process to produce a three dimensional product having a shape including protruding portions, concave portions, or the like.

The general object of the invention is achieved by a method comprising the steps of:

(1) providing a flat substrate having a minimum of 0.020 inches thickness and being made of a clear polycarbonate;

(2) printing on the front surface of said substrate using a formable ink;

(3) pre-cutting the printed substrate to establish registration holes for forming tool, this cutting step being performed, for example, by die cutting with a steel rule die;

(4) forming the printed substrate into a three dimensional shape, preferably by a cold forming process to thereby reduce the internal stress from the internal form;

(5) providing a mold having a first surface of the same configuration as said formed substrate;

(6) die cutting the formed substrate so that it fits to the molding surface with minimal interference and such that the part can be placed in the die by reason of its configuration; and (7) placing the formed substrate into the mold against said first mold surface and injecting a clear molten polycarbonate resin into the mold cavity space located behind the formed substrate, said molding step being achieved by introducing a molten polycarbonate directly behind the formed substrate through a plurality of gates, said gates being arranged so that each gate does not supply molten resin to an area greater than two square inches.

The above process produces a one-piece, permanently bonded applique product having the three dimensional shaped configuration of the formed substrate.

There are some important parameters involved in the above-described method. Thus, the thickness of the substrate material must be at least 0.020 inches. Also, the ink used in the process is a formable, high temperature ink that can withstand the stresses of the form as well as the heat from the injection of molten resin during the in-molding process. Furthermore, the molding tools face (area where the front of the applique rests on the tool) should be maintained at a temperature of 70°-110° F. Further, the resin itself should not exceed 700° F.

A feature of the method in accordance with the invention is that the polycarbonate resin is injected through gates directly onto, and perpendicular to the surface of the applique. Further, each individual gate supplies molten polycarbonate resin to an area in the mold which is no greater than two square inches.

An important advantage of the method of the invention is that it is capable of producing a three dimensional shaped product which has, therefore, not been done. Further, the use of cold forming and the subsequent injection molding process makes it possible to produce a product with a reduced amount of internal stress. The prior art methods cannot achieve this result. Further, the prior art, such as U.S. Pat. No. 4,917,927, has not considered it possible to inject directly onto the printed applique substrate because of concern that the molten resin, with its high temperatures and heat, will destroy the applique. However, with the method in accordance with the invention wherein the gates supply ah area not exceeding two square inches, it is possible to reduce the process heat and pressures and still inject directly onto the applique. The advantage of injecting directly is that it is possible to protect the flow of the molten resin and not have to force it into areas by increasing the pressure. The novel gating arrangement also makes it possible to design the mold with greater ease in that there is no restriction that the gates be located so as to prevent material from impinging upon the applique surface in a fashion that would disrupt the applique. Also, by preforming the printed applique substrate and providing a molding tool as described above, there is no need to use the molding pressures to create a product having a three dimensional configuration.

BRIEF DESCRIPTION OF THE DRAWINGS

FIG. 3 is a plan view of a printed substrate pursuant to the method in accordance with the invention.

FIG. 6 is a diagramatic view of the molding step shown in FIG. 5.

DETAILED DESCRIPTION OF THE PREFERRED EMBODIMENT

Figure 1:
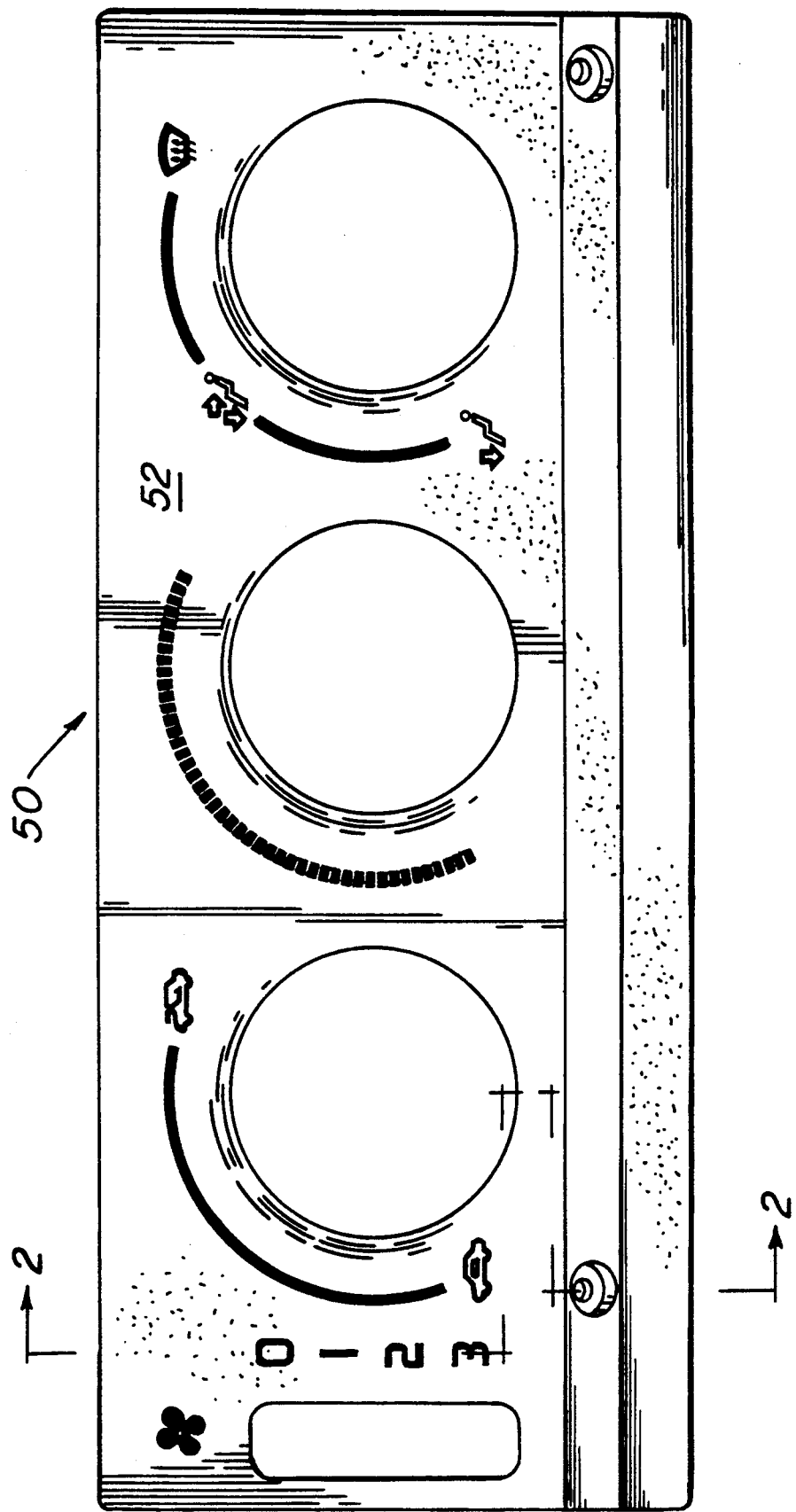
FIG. 1 is a front elevational view of a molded applique product made by the method in accordance with the invention.

An initial step in accordance with the method of the invention is to provide a flat substrate having a minimum thickness of 0.020 inches and being made of a clear polycarbonate, such as "Mylar". The substrate is indicated generally at 10 in FIG. 3, for example.

The next step in the method is to print the desired design on the front surface 12 of substrate 10 using formable ink. As shown in FIG. 3, a printed design indicated generally at 14 is provided in a rectangular configuration. The printing step is performed by the making of a plurality of printing passes wherein a single color is applied during the running of each path. The different colors are also applied in the circular areas shown in FIG. 3 located above the printed design 14, which areas 16 form no part of the completed product as will be described hereafter. Also, a plurality of marks 18 for registration holes are printed at locations located around the printed design 14 as is apparent in FIG. 3.

The next step is the shearing step wherein the printed substrate 10 is precut into rectangles and has a plurality of registration holes (at marks 18) punched therein. This step produces a printed part that is prepared to be used in a forming tool whereby it is shaped to fit within the tool and to register with the registration pins of said tool. This step is preferably performed by die cutting with a steel rule die.

Figure 4:
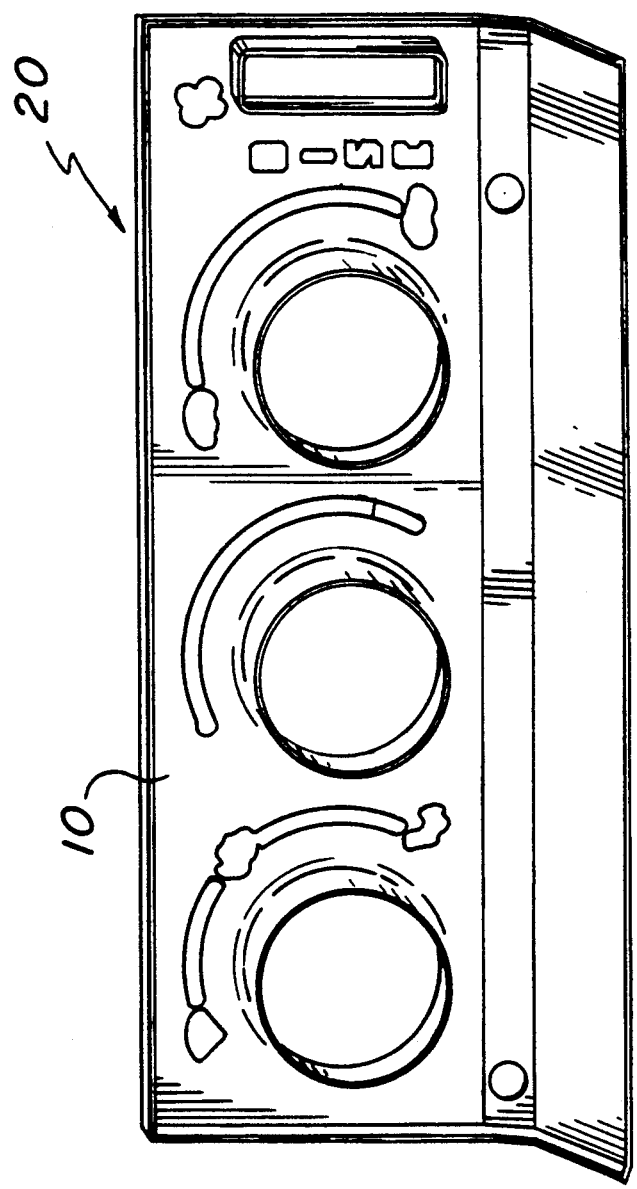
FIG. 4 is a perspective view of a formed substrate pursuant to the method of the invention.

The next step is the forming step wherein the precut printed substrate is formed into a three-dimensional shape, such as the formed substrate 20 illustrated in FIG. 4. The forming step is preferably performed by a cold forming process to thereby reduce the internal stress from the internal form. In this step, the flat sheet is placed into a forming press which is run through its forming cycle to form the sheet into the three-dimensional shape desired, which shape can have, as illustrated in FIG. 4, a bent configuration including protruding portions or concave portions.

The next step is to cut the formed substrate 20 into a configuration such that it fits into the die used in the molding step to be performed hereafter in a manner that the configuration of the formed substrate 20 serves to hold it in place. Thus, the formed substrate 20 must by cut so that it fits into the molding tool with a minimal interference fit.

Figure 5:
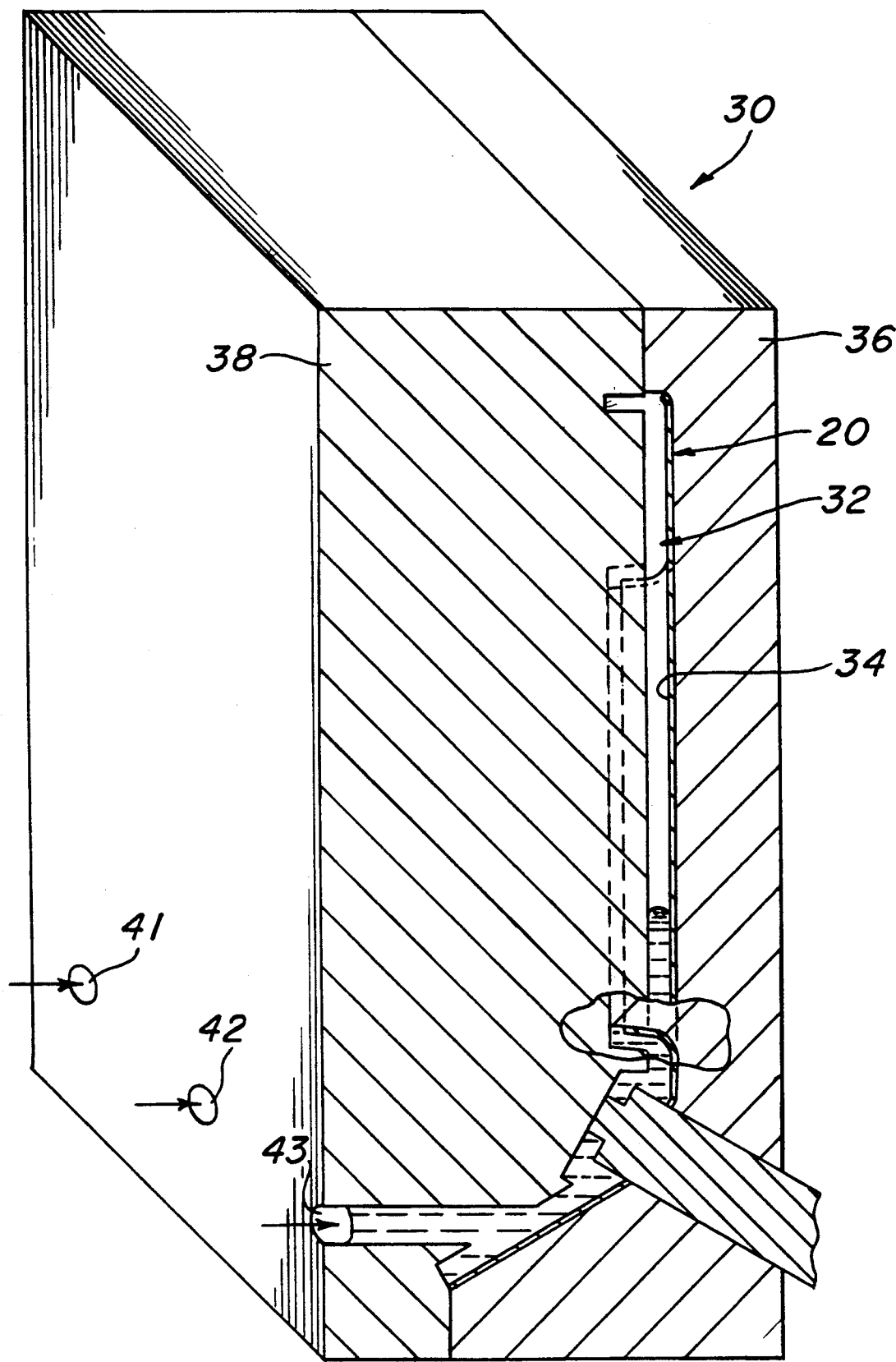
FIG. 5 is a perspective view illustrating the molding step pursuant to the method in accordance with the invention.

In FIG. 5, there is shown a molding tool 30 for use in the method in accordance with the invention. The molding tool 30 provides a cavity 32 which includes a first surface 34 that has the same configuration as that of the formed substrate 20. The molding tool 30 is formed of a front half 36 and a back half 38 which are secured together to define the mold cavity 32 therebetween. The back mold half 38 is provided with three gates 41, 42, and 43 through which the molten material is introduced into the bottom of the cavity 32. The three gates 41, 42, and 43 extend in a direction perpendicular to the mold cavity 32. Moreover, as is best shown in FIG. 6, the molding tool 30 is constructed and arranged so that each gate does not supply molten resin to an area of the mold cavity 32 greater than two square inches.

The next step in the method is the insert molding step wherein the formed substrate 20 is placed into the cavity 32 of the molding tool 30 against the front mold surface 34 in a position as illustrated in FIG. 5. After this, a clear molten polycarbonate resin is injected into the mold cavity space located behind the formed substrate. This step is achieved by introducing the molten polycarbonate in the bottom of cavity 32 directly behind the formed substrate through the three gates 41, 42, and 43 constructed and arranged in the manner as described above so that each gate 41, 42 or 43 does not supply molten resin to an area of mold cavity 32 greater than two square inches. FIG. 6 illustrates the flow of the molten resin upwardly within cavity 32.

Figures 2, 2A:
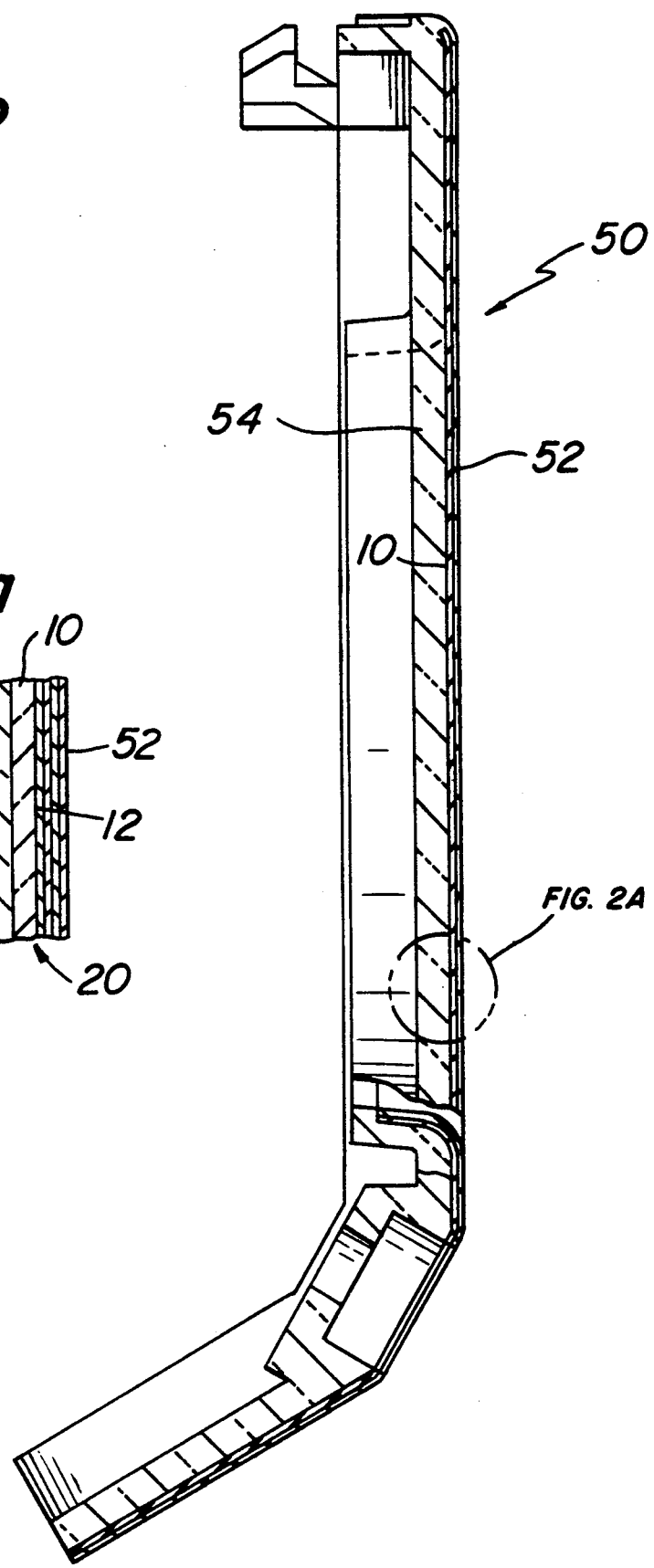
FIG. 2 is a section taken on line 2—2 of FIG. 1.
FIG. 2a is an enlarged detailed view of the circled portion shown in FIG. 2.

The above-described method produces a one-piece permanently bonded applique product having the three dimensional shaped configuration of the formed substrate 20 as is apparent from FIGS. 1 and 2 which illustrates the molded-applique product 50. Thus, the product 50 comprises a front wall comprising formed substrate 20, which includes a plurality of printed layers 52 which are applied to the front face 12 of the substrate 10, and a back wall comprising the clear polycarbonate resin substrate 54.

EXAMPLE

The parts were printed, seven-up, on a 22 inch by 31 inch, 0.020 inch thick polycarbonate sheet, all printing being a front surface operation. Below is a list of the passes and the specifications for running these passes:

| PASS | INK | DRY TIME | SCREEN | EMULSION | BLADE |
| --- | --- | --- | --- | --- | --- |
| 1. Pinhole | 40070306 Mylar | 3.5 hrs. | 270 Wire | Direct | 85 D. Sharp |
| 2. Green | 40070271 Mylar | 3.0 hrs. | 270 Wire | Direct | 85 D. Sharp |
| 3. White | 40070307 Mylar | 3.0 hrs. | 270 Wire | Direct | 85 D. Sharp |
| 4. Yellow | 40070313 Mylar | 3.5 hrs. | 270 Wire | Direct | 85 D. Sharp |
| 5. Red | 40070314 Mylar | 3.5 hrs. | 270 Wire | Direct | 85 D. Sharp |
| 6. Blue | 40070317 Mylar | 3.5 hrs. | 270 Wire | Direct | 85 D. Sharp |

| PASS | INK | DRY TIME | SCREEN | EMULSION | BLADE |
|---|---|---|---|---|---|
| 7. Graphics | 40070306 Mylar | 3.5 hrs. | 270 Wire | Indirect/Direct | 85 D. Sharp |

After printing, the parts were sheared into rectangles for use in a one cavity forming tool. Registration holes were punched in the parts at this time also, whereby the parts were ready for the forming press.

The forming step was performed in a one cavity tool. Each part was placed on the tool's registration pins by inserting the pins within the registration holes previously punched therein and the part was then formed. The forming procedure involved the following steps:

1. The tool was placed on the shuttle table that enters the press.
2. A "slow-close" technique was used to set the machine to the configuration of the tool.
3. Pressures were then set to 4,000 pounds.
4. Parts were then placed on the tool using the registration pins established.
5. The parts were then run through the forming cycle two times and then removed.

In the next step, i.e., the cutting step, the parts were lazer cut to a desired size so as to fit properly in the molding tool.

After cutting, the parts were placed by hand into the form molding tool, with the configuration of the form serving to hold the part in place. Caution was taken that the part sits flush with the forming tool. The head of the tool whereat the applique sits was cooled to 70° F. using cooling lines and the molten polycarbonate was set to 700° F. at 500 psi. The polycarbonate was then injected into the mold cavity behind the printed part. During operation, the pressures and temperatures in the molding process were held as low as possible to reduce the chances of the ink running.

The part was then removed from the die and masked in the back thereof at all locations with the exception of the graphic areas. This reduced the possibility of pin holes.

After the parts were masked, they were spray coated to provide a coating thereon for anti-scratch and solvent resistiveness. The part was then examined for suitability for shipment.

What is claimed is:

1. A method of making applique products of the type made of synthetic resins and having printing thereon by a molding process to produce a three dimensional product having a shape including protruding portions or concave portions comprising the steps of:
   (1) providing a flat substrate having a minimum of 0.020 inches thickness, said substrate being made of a synthetic resin,
   (2) printing on a front surface of said substrate using a formable ink,
   (3) preparing the printed substrate for forming,
   (4) forming the printed substrate into a three dimensional shape having a front surface and a back surface,
   (5) providing a mold having a cavity including a mold surface of the same configuration as the front surface of said formed substrate,
   (6) preparing the formed substrate to have dimensions such that it fits into the mold cavity in a secure position with said front surface of said formed substrate in contact with said mold surface,
   (7) placing the formed substrate into the cavity of the mold in a secure position with said front surface of said formed substrate in contact with said mold surface and closing the mold in preparation for a molding operation, and, after the completion of steps (1) to (7),
   (8) injecting a molten resin into the cavity space located adjacent said back surface of said formed substrate at locations so the resin flows directly onto the formed substrate through a plurality of gates, said gates being constructed and arranged so that each gate does not supply molten resin to an area of the mold cavity greater than a predetermined area so as to reduce internal stress in the applique product produced,
   wherein step (4) is performed by a cold forming process to thereby reduce internal stress produced in the formed substrate,
   wherein step (6) of preparing the formed substrate is performed by die-cutting the formed substrate in a manner such that it is dimensioned to be placed into the mold with a minimal interference fit,
   wherein said flat substrate of step (1) is a clear polycarbonate and said molten resin of step (7) is made of a clear molten polycarbonate resin,
   wherein said formable ink is a high temperature ink that can withstand the stresses of the forming step as well as the heat from the injection of molten resin,
   wherein said mold surface is maintained at a temperature of 70°-110° F. and the molten resin temperature does not exceed 700° F., and
   wherein said molten resin is injected through gates directly onto and perpendicular to the back surface of the formed substrate placed in the mold in step (7).

2. The method according to claim 1 wherein each gate does not supply molten resin to an area of the mold cavity greater than two square inches.

3. The method according to claim 1 wherein step (3) of preparing the substrate for forming is performed by precutting the printed substrate to establish registration holes for forming by means of a cutting step performed by die-cutting with a steel rule die.

* * * * *